US006510233B1

United States Patent
Nakano (12) United States Patent
(10) Patent No.: US 6,510,233 B1
(45) Date of Patent: Jan. 21, 2003

(54) ELECTRONIC WATERMARK INSERTION DEVICE

(75) Inventor: Hirotaka Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/303,848

(22) Filed: May 3, 1999

(51) Int. Cl.[7] .................................................. G06K 9/00
(52) U.S. Cl. ...................................... 382/100; 713/176
(58) Field of Search ................................. 382/100, 232, 382/248, 287; 380/210, 54, 525, 252; 713/176, 179; 348/461, 463

(56) References Cited

U.S. PATENT DOCUMENTS

| 5,675,667 | A | * | 10/1997 | Suzuoki | 382/232 |
| 5,949,885 | A | * | 9/1999 | Leighton | 380/54 |
| 6,175,639 | B1 | * | 1/2001 | Stoh et al. | 382/100 |
| 6,259,801 | B1 | * | 7/2001 | Wakasu | 382/100 |
| 6,282,299 | B1 | * | 8/2001 | Twefik | 382/100 |
| 6,408,082 | B1 | * | 6/2002 | Rhoads | 382/100 |

FOREIGN PATENT DOCUMENTS

| EP | 0 840 513 A2 | 5/1998 |
| JP | 5-30466 | 2/1993 |
| JP | 6-315131 | 11/1994 |
| JP | 8-241403 | 9/1996 |
| WO | WO 98/03014 | 1/1998 |

* cited by examiner

Primary Examiner—Leo Boudreau
Assistant Examiner—Abolfazl Tabatabai
(74) Attorney, Agent, or Firm—Scully, Scott, Murphy & Presser (57) ABSTRACT

The present invention relates to an electronic watermark burying device that does not bury the same electronic watermark data in a superimposing mode. An electronic watermark insertion device comprises discrete cosine transforming means for subjecting an input image into a discrete cosine transformation; electronic watermark burying means for inserting electronic watermark data to data transformed by the discrete cosine transforming means; electronic watermark detecting means for detecting whether or not the electronic watermark data to be inserted by the electronic watermark burying means has been already inserted into the input image; and selecting means for selecting the output data from the discrete cosine transforming means when the electronic watermark detecting means detects that the electronic watermark data has been already inserted into the input image or for selecting output data from the electronic watermark burying means when the electronic watermark detecting means does not detect that the electronic watermark data has been not inserted into the input image; and means for subjecting data selected by the selecting means into an inverse discrete cosine transformation.

16 Claims, 4 Drawing Sheets

ELECTRONIC WATERMARK INSERTION DEVICE

BACKGROUND OF THE INVENTION

The present invention relates to an electronic watermark insertion device suitable for digital images, and particularly to an electronic watermark insertion device for inserting electronic watermark into digital images.

Recently, illegal copies of digital images have become an important problem. Unlike analog images, since digital images are recognized by 0s and 1s, they can be repeatedly replicated without any degradation in image quality. This inherent feature has caused great damage to digital image copyright holders.

In order to prevent such illegal replication, it is considered to prepare a reproduction system that encrypts digital image data and has a valid secret decryption key whereby encrypted digital image data can be reproduced. However, after the encryption is once decoded, this system cannot prevent subsequent replication.

In order to prevent digital images from being illegally used or replicated, the method has been considered of burying special information (hereinafter referred to as "electronic watermark data") in a digital image itself.

Two types of data including visible electronic watermark data and invisible electronic watermark data are considered as electronic watermark data for digital images.

The visible electronic watermark data, which contains special characters or symbols combined with an image, can be visually sensed. This electronic watermark data may degrade the image quality but has the advantage of visually warning users to prevent misappropriation of digital images.

An example of burying such visible electronic watermark data is disclosed in JP-A-241403/1996. This patent publication discloses a method of placing a visible watermark on a digital image. This method consists of the steps of supplying an original digital image, supplying a digital watermark image, and superimposing the watermark on the original image, without changing the chromaticity of pixels of the original image upon watermarking, to create a watermarked image. This method is characterized in that the image-creating step includes the step of varying the brightness (not color) of respective opaque pixels in a watermarked image to correct pixels corresponding to the original image. In this method, only the brightness of pixels corresponding to opaque portions of electronic watermark data is varied so that visible electronic watermark data is synthesized with the original image without changing the color components. The scaling value of varying the pixel brightness component depends on color components, random numbers, pixel values of electronic watermark data, or others. The prominence of the watermark is determined by the scaling value.

In invisible electronic watermark data, electronic watermark data is buried in an image, in consideration of degradation of image quality. Since the image quality degradation is not substantially negligible, the watermark cannot be visually recognized.

As described above, since special information, which can be recognized by an author, is buried as the electronic watermark data, the author can be specified by detecting the electronic watermark data even after illegal replication. Moreover, information about replication disapproval may be buried in an image. In such a case, when the reproduction unit, for example, detects the replication disapproval information, the reproduction by a VTR or the equivalent can be restricted by informing the user that the detected information is reproduction prohibited data, or by operating the replication preventing mechanism within the reproduction unit.

As one method of burying invisible electronic watermark data into digital images, special information is buried as electronic watermark data in portions not substantially affecting the image quality, such as LSBs (least significant bits) of pixel data. However, according to this method, the electronic watermark data can be easily removed from images. For example, information regarding LSBs of pixels will be missed using a low-pass filter. The image compression process discards the volume of information not adversely affecting the image quality, thus reducing the volume of data. This means that the electronic watermark data is lost. As a result, the problem is that it is difficult to re-detect the electronic watermark data.

JP-A-No. 315131/1994 shows another example of the electronic watermark burying method. This publication discloses the method of burying specific information by using the correlation between continuous frame images and detecting the area where degradation in image quality does not occur even when substitution is performed in peripheral areas upon reproduction. According to this method, an image is reconstituted by specifying an identification data buried area using the signal dropout portion and conversion information upon reproduction and then by correcting the corresponding portion.

As further another example, JP-A-No. 30466/1993 discloses the method of converting the frequency of a video signal and then burying information with signals of frequencies lower than the frequency band of the converted video signal. In this method, a broad band-pass filter extracts the original video signal while a low-pass filter extracts the buried identification data.

In another example, the method of frequency-converting images and then burying electronic watermark data into portions with strong frequency components of a video signal after the frequency conversion (see "NIKKEI Electronics", 1996, 4.22 (no. 660), page 13). In this method, since electronic watermark data is buried into frequency components, the electronic watermark data is not lost through the compression process or filtering image process. Moreover, using the random numbers with a normal distribution as electronic watermark data makes it difficult to prevent interference between electronic watermark data and to destroy the electronic watermark data without significantly affecting the entire image.

In the electronic watermark data burying method, the original image is first transformed into frequency components by the DCT (discrete cosine transformation) 703. n pieces of data with high values over high frequency range are selected as $f(1), f(2), \ldots, f(n)$. The electronic watermark data, $w(1), w(2), \ldots w(n)$, are selected from a normal distribution having an average of 0 and a dispersion of 1. The formula, $F(i)=f(i)+\alpha \times |f(i)| \times w(i)$, where $\alpha$ is a scaling factor, is calculated to obtain respective (i)s. Finally, the image in which the electronic watermark data is buried is obtained based on the frequency component in which $f(i)$ is substituted for $F(i)$.

Moreover, the electronic watermark data is detected according to the following method. In this detection method, both the original image and electronic watermark data candidate $w(i)$ (where $i=1, 2, \ldots, n$) must be known.

First, the image containing electronic watermark data is converted into frequency components through, for example, DCT. Values corresponding to factor values, f(1), f(2), ..., f(n), each containing an electronic watermark, are set as F(1), F(2), ..., F(n), respectively. The formula, W(i)=(F(i)−f(i))/f(i), is solved using f(i) and F(i) to extract the electronic watermark data W(i). Next, the statistical similarity C between w(i) and W(i) is obtained by the following formula including a vector inner product.

$$C=W \bullet w/(WD \times wD)$$

where W=(W(1), W(2), ..., W(n)); w=(w(1), w(2), ..., w(n)); WD=the absolute value of a vector W; wD=the absolute value of a vector w; and the symbol • represents an inner product.

When the statistical similarity C is more than a specific value, it is judged that the electronic watermark data is in a buried state.

The above-mentioned method, where the electronic watermark data is buried into an image, is effective when an author holding an original image detects digital image data suspected as an illegal replicate.

In the above-mentioned method that requires an original image, the author, that is, an original image owner, can detect image data doubted as an illegal replicate. However, the reproduction unit in each terminal cannot detect electronic watermark data because of the absence of the original image.

To overcome that problem, an improvement of the above-mentioned method for the terminal processing has been proposed. In the improved method, the original image is divided into blocks each having K pixels×K pixels. Electronic watermark data is buried or extracted in block process units.

In the electronic watermark data burying process, AC frequency components are set as f(1), f(2), ..., f(n) in a frequency increasing order over a frequency range after the discrete cosine transformation. The electronic watermark data, w(1), w(2), ..., w(n) are selected from the normal distribution having an average of 0 and a dispersion of 1. In order to obtain respective (i)s, the formula of F(i)=f(i)+α×avg(f(i))×w(i) is calculated, where α is a scaling factor and avg(f(i)) is a partial average obtained by averaging the absolute values at three points adjacent to f(i). An image in which electronic watermark data is buried can be obtained from the frequency components where f(i) is substituted with F(i).

Electronic watermark data is detected according to the following method. This method does not require any original image. It is merely required that electronic watermark data candidate w(i) (where i=1, 2, ..., n) is known.

Over the frequency band where electronic watermark data contained image is subjected to a discrete cosine transformation, the frequency components are set as F(1), F(2), ..., F(n) in a frequency increasing order. The average of the absolute values of three adjacent points in the watermark data F(i) is set to a partial average avg(F(i)). The electronic watermark data W(i) is obtained by calculating the following formula.

$$W(i)=F(i)/\text{avg}(F(i))$$

Moreover, the sum WF(i) is obtained by calculating w(i) for each frame according to the above-mentioned formula. Next the statistical similarity C between w(i) and WF(i) is obtained by calculating the following formula including an vector inner product:

$$C=WF \bullet w/(WFD \times wD)$$

where WF=(WF(1), WF(2), ..., WF(n)); w=(w(1), w(2), ..., w(n)); WFD=the absolute value of a vector WF; wD=the absolute value of a vector w; and the symbol • represents an inner product. When the statistical similarity C is more than a specific value, it is judged that the corresponding electronic watermark data is in a buried state.

Figure 3:
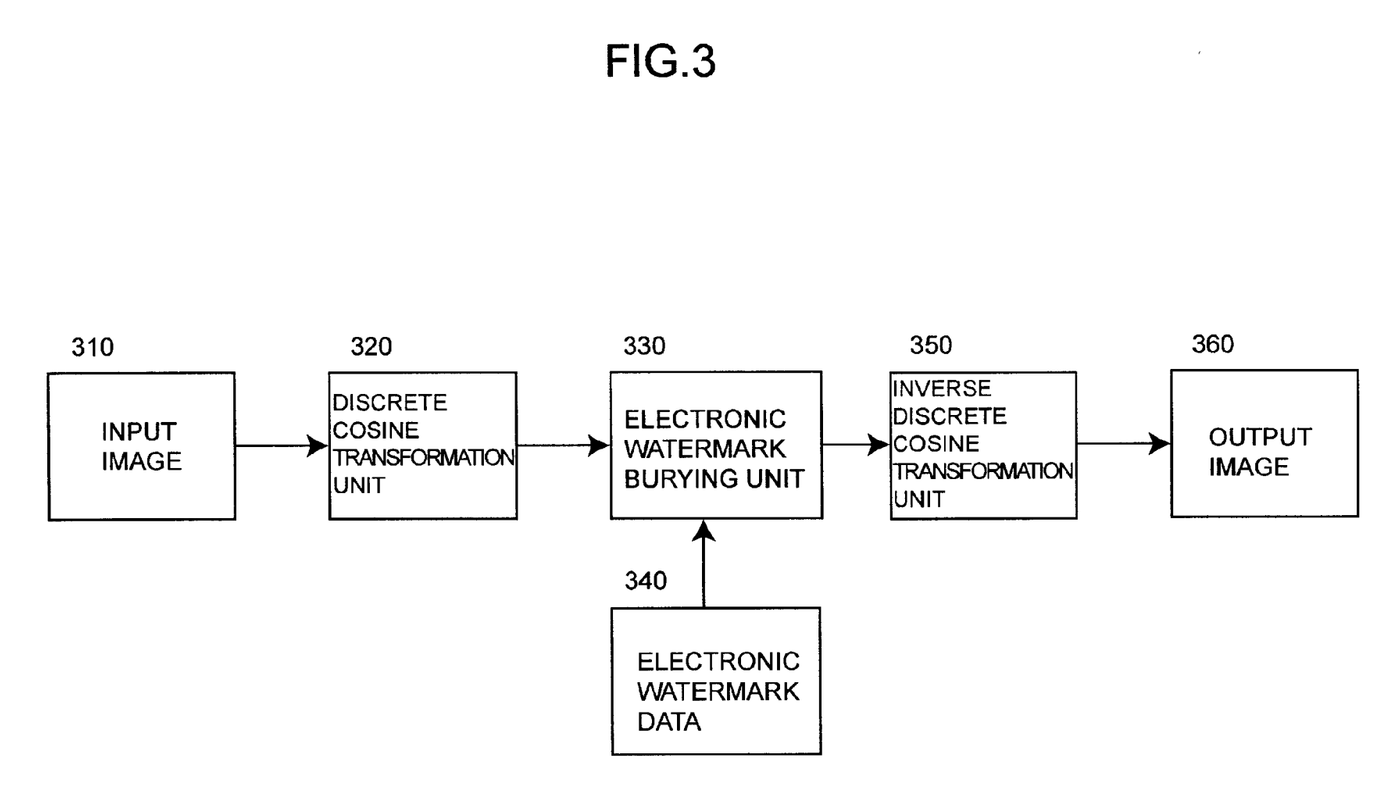
FIG. 3 is a block diagram illustrating a prior-art electronic watermark data insertion device.

FIG. 3 shows a prior art electronic watermark inserting device employing the above-mentioned method. Referring to FIG. 3, the input image 310 is transformed from the time region to the frequency region by means of the discrete cosine transformation unit 320. The electronic watermark burying unit 320 inserts the electronic watermark data 340 in the resultant data. The buried electronic watermark data is transformed from the frequency region to the time region by means of the inverse discrete cosine transformation unit 350. Thus, the output image 360 with the inserted electronic watermark data can be obtained.

However, the prior-art device may insert evenly and repeatedly electronic watermark data even in an image with the same.

Figure 4:
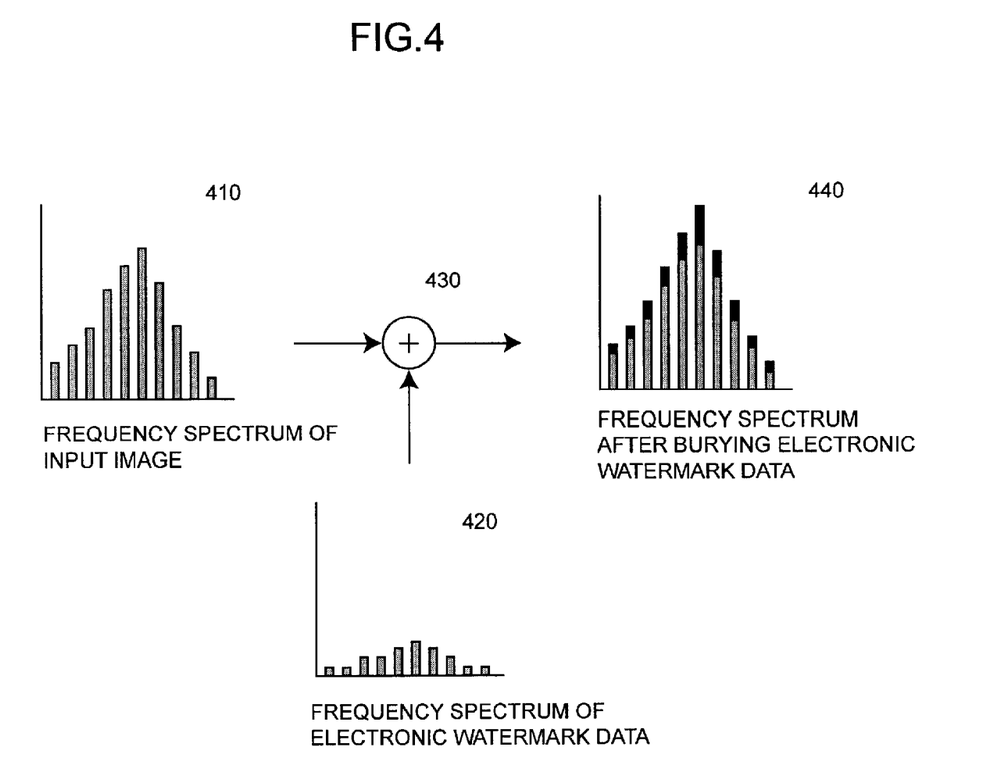
FIG. 4 is a diagram explaining a method of burying electronic watermark data over a frequency band.

FIG. 4 schematically shows the concept of burying electronic watermark data in a frequency region. The frequency spectrum 440 after the electronic watermark data burying operation is formed by adding the frequency spectrum 420 of electronic watermark data to the frequency region of an input image. Allocating a specific region of an input image does not depend on the type of electronic watermark data. When the electronic watermark data burying process is performed plural times, the same electronic watermark data is again buried on the frequency spectrum of an image with data previously buried. If the same electronic watermark data is buried twice or three times, the upper black portion corresponding to the buried amount becomes larger in the frequency spectrum 440' after the burying process. When the frequency region of the spectrum is converted into the time region, the burying noises become larger, so that images are emphasized with the noise components.

Each piece of electronic watermark data is inserted as very feeble noises, compared with the original image and is not visually recognized by a human eye. However, there is the problem in that if noises repeatedly integrated are large, it may be sensed by the human eye, thus leading to degradation in image quality.

SUMMARY OF THE INVENTION

The present invention is made to solve the above-mentioned problems.

Moreover, the objective of the invention is to provide an electronic watermark data burying device that can bury the same electronic watermark data into an image only once, not duplicatively.

The objective of the present invention is achieved by an electronic watermark insertion device comprising discrete cosine transforming means for subjecting an input image to a discrete cosine transformation; electronic watermark burying means for inserting electronic watermark data into data transformed by the discrete cosine transforming means; electronic watermark detecting means for detecting whether or not the electronic watermark data to be inserted by the electronic watermark burying means has been already inserted into the input image; and selecting means for selecting the output data from the discrete cosine transforming means when the electronic watermark detecting means detects that the electronic watermark data has been already inserted into the input image or for selecting output data from the electronic watermark burying means when the electronic watermark detecting means does not detect that the electronic watermark data has been inserted into the input image; and means for subjecting data selected by the selecting means to an inverse discrete cosine transformation.

In the electronic watermark insertion device according to the present invention, the electronic watermark detecting means decides that the corresponding electronic watermark data is buried, when a statistical similarity C is more than a specific value.

Moreover, in the electronic watermark insertion device according to the present invention, the electronic watermark detecting means first orthogonally converts an image with the electronic watermark data into a frequency component; calculates and extracts electronic watermark data $W(i)$ using the formula $W(i)=(F(i)-f(i))/f(i)$, where both an original image and electronic watermark data candidate wi (where i=1, 2, ... n) are known; where $f(1), f(2), \ldots f(n)$ to which electronic watermarks are respectively buried in a frequency range correspond factor values $F(1), F(2), \ldots, F(n)$; next calculates a statistical similarity C between $w(i)$ and $W(i)$ using the formula, $C=W \bullet w/(WD \times wD)$, where $W=(W(1), W(2), \ldots W(n))$, $w=(w(1), w(2), \ldots w(n))$, WD=the absolute value of a vector W, and wD=the absolute value of a vector w), and the symbol $\bullet$ represents a vector inner product; and detects that the electronic watermark data is in a buried state when the statistical similarity C is more than a specific value.

In the electronic watermark insertion device according to the present invention, the electronic watermark burying means sets AC frequency components $(f(1), f(2), \ldots, f(n))$ in a frequency increasing order over a frequency range after a discrete cosine transformation; selects electronic watermark data, $w(1), w(2), \ldots, w(n)$, from normal distribution having an average of 0 and a dispersion of 1; and calculates respective (i)s the formula, $F(i)=f(i)+\alpha \times |f(i)| \times w(i)$ (where $\alpha$ is a scaling factor) so that an image, in which the electronic watermark data is buried, is obtained from the frequency component in which $f(i)$ is substituted with $F(i)$.

Moreover, in the electronic watermark insertion device according to the present invention, the electronic watermark burying means sets AC frequency components $(f(1), f(2), \ldots, f(n))$ in a frequency increasing order over a frequency range after a discrete cosine transformation; selects electronic watermark data, $w(1), w(2), \ldots, w(n)$, from normal distribution having an average of 0 and a dispersion of 1; and calculates respective (i)s using the formula, $F(i)=f(i)+\alpha \times avg|f(i)| \times w(i)$ (where $\alpha$ is a scaling factor and avg $f(i)$ is a partial average of absolute values of $f(i)$ at three adjacent points) so that an image, in which the electronic watermark data is buried, is obtained from the frequency component in which $f(i)$ is substituted with $F(i)$.

Moreover, according to the present invention, an electronic watermark insertion device comprises orthogonal converting means for subjecting an input image to an orthogonal conversion; electronic watermark burying means for inserting electronic watermark data to data converted by the orthogonal converting means; electronic watermark detecting means for detecting whether or not the electronic watermark data to be inserted by the electronic watermark burying means has been already inserted into the input image; selecting means for selecting the output data from the orthogonal converting means when the electronic watermark detecting means detects the electronic watermark data already inserted into the input image or for selecting output data from the electronic watermark burying means when the electronic watermark detecting means does not detect the electronic watermark data inserted into the input image; and means for subjecting data selected by the selecting means into an inverse discrete cosine transformation.

Furthermore, according to the present invention, an electronic watermark insertion device comprises orthogonal converting means for subjecting an input image to an orthogonal conversion; electronic watermark detecting means for detecting whether or not electronic watermark data to be inserted has been already inserted into the input image; electronic watermark data selecting means for selecting electronic watermark data by which the input image is not affected in data insertion when the electronic watermark detecting means detects the electronic watermark data already inserted into the input image or for selecting the electronic watermark data to be inserted when the electronic watermark detecting means does not detect the electronic watermark data inserted into the input image; electronic watermark burying means for inserting electric watermark data selected by the electronic watermark data selecting means into data converted by the orthogonal converting means; and means for subjecting data into which the electronic watermark data is buried by the electronic watermark burying means, to an inverse orthogonal conversion.

In the electronic watermark insertion device according to the present invention, the electronic watermark detecting means decides that the corresponding electronic watermark data is buried, when a statistical similarity C is more than a specific value.

In the electronic watermark inserting device according to the present invention, the orthogonal converting means performs discrete Fourier transformation, discrete cosine transformation, Hadamard-Walsh transformation, or Karhunen-Loeve transformation.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

Embodiments of the present invention will be described below with reference to the attached drawings.

First Embodiment

Figure 1:
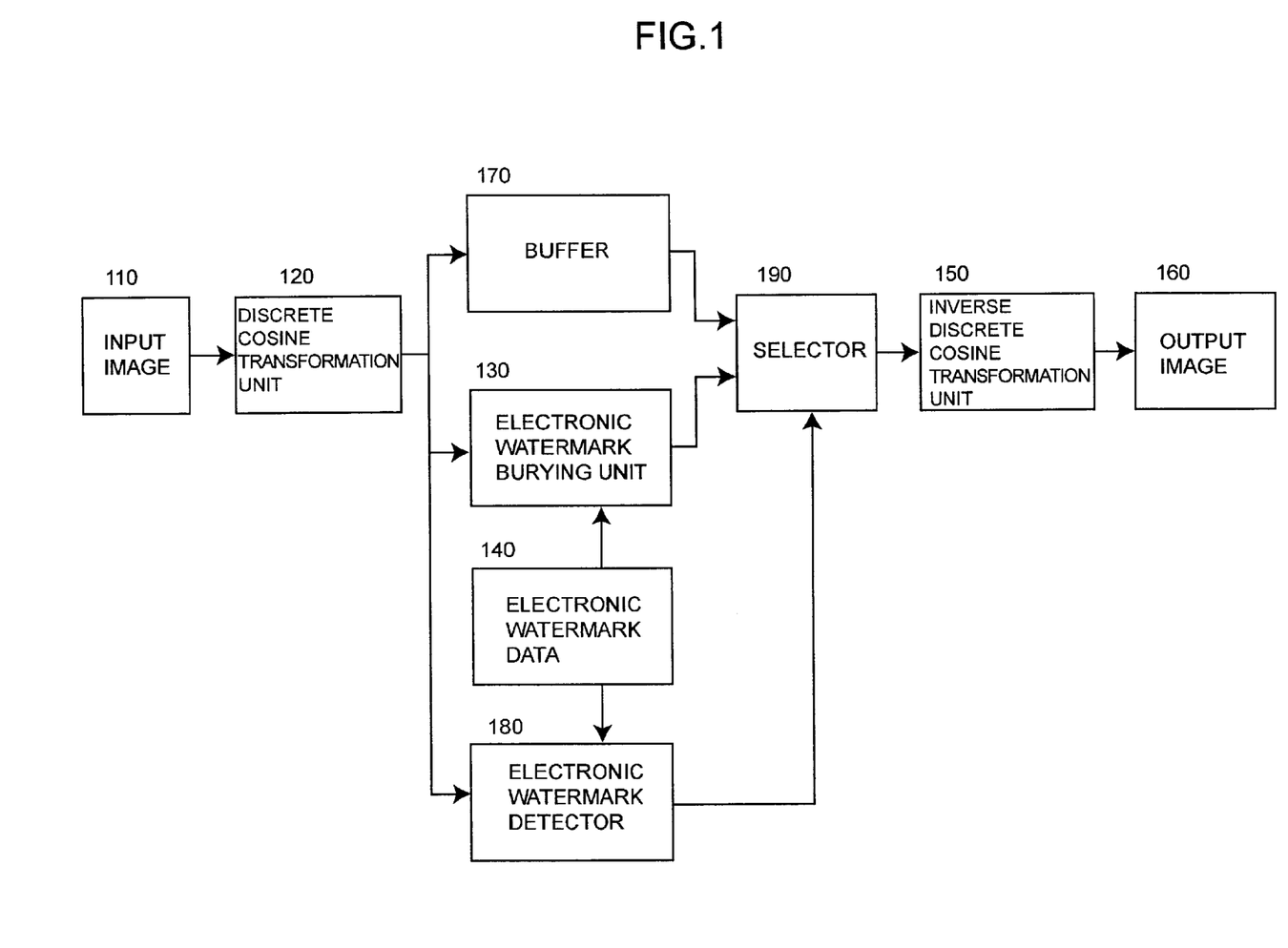
FIG. 1 is a block diagram illustrating an electronic watermark data insertion device according to a first embodiment of the present invention.

The first embodiment of the present invention will be now described with reference with the drawings. Referring to FIG. 1, the electronic watermark data insertion device consists of an input image 110, a discrete cosine transformation (DCT) unit 120 for transforming an input image from a time region to a frequency region, an electronic watermark inserting unit 130 for inserting electronic watermark data into data converted into a frequency region by means of the discrete cosine transformation unit 120, electronic watermark data 140 to be inserted by the electronic watermark burying unit 130, an electronic watermark detector 180 for detecting whether or not the electronic watermark data 140 is inserted into data output from the discrete cosine transformation unit 120, a buffer 170 for temporarily storing data output from the discrete cosine transformation unit 120, a selector 190 for selecting data from the electronic watermark burying unit 130 or data from the buffer 170 in response to the output from the electronic watermark detector 180, an inverse discrete cosine transformation (inverse DCT) unit 150 for transforming data from the selector 190 from a frequency region to a time region, and an output image 160 to be output from the inverse discrete cosine transformation unit 150.

Next, the operation of the electronic watermark data burying device shown in FIG. 1 will be described with reference to the drawings.

The discrete cosine transformation (DCT) unit 120 orthogonally converts the input image 110 from a time region to a frequency region. The converted data is input to the electronic watermark burying unit 130, the electronic watermark detector 180 and the buffer 170.

The electronic watermark burying unit 130 inserts electronic watermark data 140 to the converted data. At the same time, the electronic watermark detector 180 detects whether or not the electronic watermark data 140 is in an inserted state in the input data. The buffer 170 temporarily stores the output data of the discrete cosine transformation unit 120.

The selector 190 selects either the output data from the electronic watermark burying unit 130 or the output data from the buffer 170 based on the detection result of the electronic watermark detector 180. That is, the selector 190 selects the output data from the electronic watermark burying unit 130 when the electronic watermark detector 180 does not detect the output data and selects the output data from the buffer 170 when the electronic watermark detector 180 detects the output data.

The data selected by the selector 190 corresponds to the output image 160 transformed from the frequency region to the time region by the inverse cosine transformation unit 150.

As described above, only when the input image 110 does not contain the electronic watermark data 140, the electronic watermark data 140 is inserted in the input image 110.

In this embodiment, the buffer 170 is used to synchronize two data to be selected by the selector 190 with each other, in consideration of the process time of the electronic watermark burying unit 130. If the process time of the electronic watermark burying unit 130 is practically and negligibly short, the buffer 170 can be omitted.

Second Embodiment

Next, the second embodiment of the present invention will be described with reference to the attached drawings.

Figure 2:
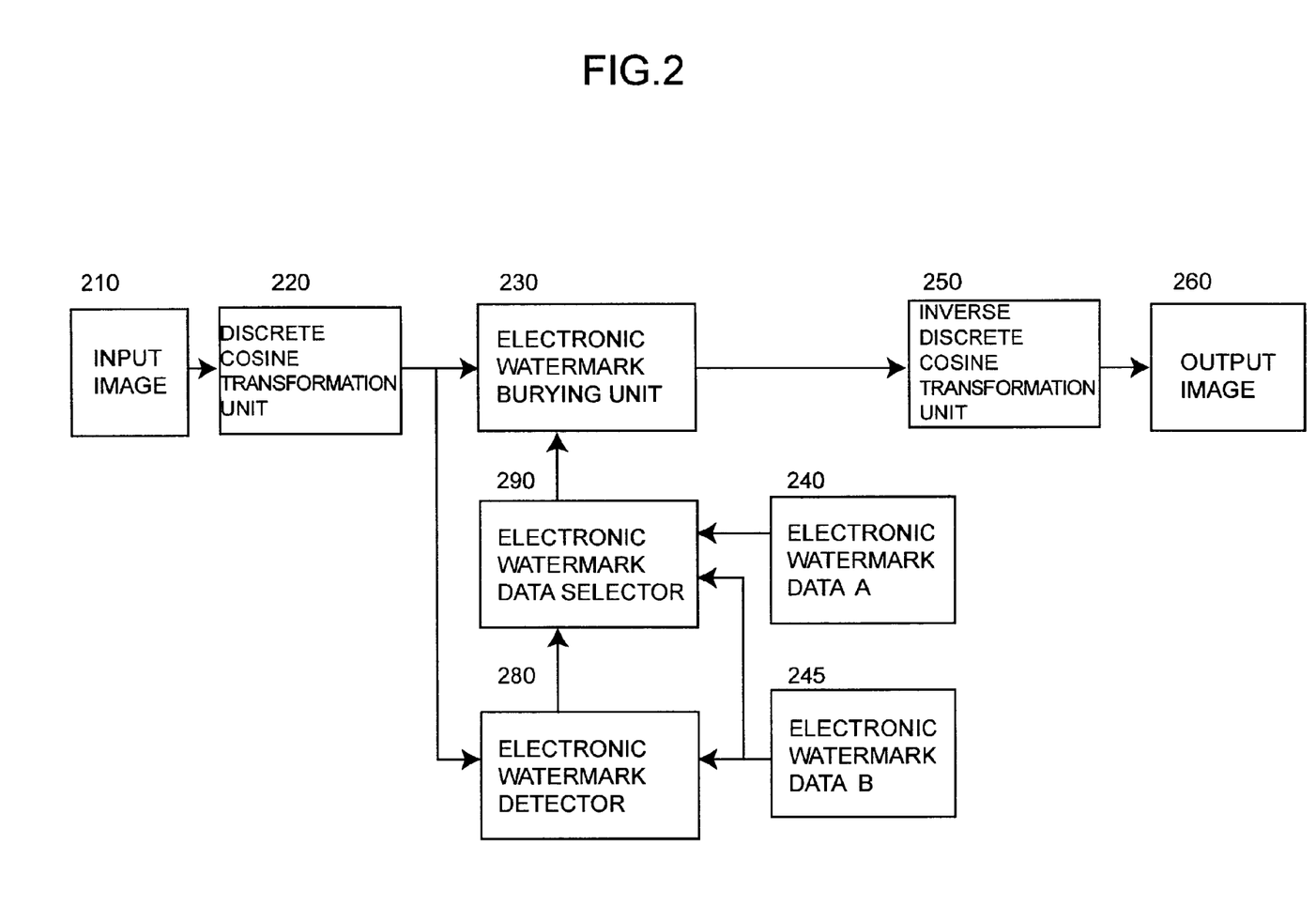
FIG. 2 is a block diagram illustrating an electronic watermark data insertion device according to a second embodiment of the present invention.

Referring to FIG. 2, the electronic watermark data insertion device consists of an input image 210, a discrete cosine transformation (DCT) unit 220 for transforming an input image from a time region to a frequency region, electronic watermark data B245 to be inserted, electronic watermark detector 280 for detecting whether or not the electronic watermark data 245 is inserted into data output from the discrete cosine transformation unit 220, an electronic watermark data selector 290 for selecting the electronic watermark data A240 or the electronic watermark data B245 based on the detection result from the electronic watermark detector 280, an electronic watermark burying unit 230 for inserting electronic watermark data selected by the electronic watermark data selector 290 into data transformed into a frequency region by means of the discrete cosine transformation unit 220, an inverse discrete cosine transformation (inverse DCT) unit 250 for transforming data output from the electronic watermark burying unit 230 from the frequency region to the time region, and an output image 260 to be output from the inverse discrete cosine transformation unit 250.

Next, the operation of the electronic watermark data burying unit will be described with reference to FIG. 2.

The discrete cosine transformation (DCT) unit 220 orthogonally transforms the input image 210 from the time region to the frequency region. The transformed data is input to the electronic watermark burying unit 230 and the electronic watermark detector 280.

The electronic watermark detector 280 detects whether or not there is the electronic watermark data B245 inserted into the input data. The electronic watermark data selector 290 selects electronic watermark data based on the detection result of the electronic watermark detector 280. That is, when the electronic watermark data detector 280 does not detect electronic watermark data B245, the electronic watermark data selector 290 selects it. When the electronic watermark data detector 280 detects electronic watermark data, the electronic watermark data selector 290 selects the electronic watermark data A245.

Because the input image converted into a frequency region is detected, it is not needed to bury watermark information all over the space range of the input image. However, where a watermark image is buried in a part of divided blocks of the input image, the missing information about a block can be restored with information about another block.

The electronic watermark burying unit 230 inserts electronic watermark data selected by the electronic watermark data selector 290 into an image. The inverse discrete cosine transformation unit 250 transform s the output data from the electronic watermark burying unit 230 from the frequency region to the time region and then outputs the output image 260.

Inputting the electronic watermark data A240 with no frequency components does not adversely affect the input image. Hence, the input image which previously contains the electronic watermark data B245 is not substantially subjected to the electronic watermark data insertion and is output without any change.

In this embodiment, it is assumed that the process time of the electronic watermark detector 280 and the data selector 290 is negligibly short. If the process time is not negligible, a buffer is connected to the input of the electronic watermark burying unit 230. The buffer temporarily stores the output data of the discrete cosine transformation unit 220 and then inputs it to the electronic watermark data detector 230. Thus the process time of the electronic watermark detector 280 and the electronic watermark data selector 290 can be canceled.

Where the block coordinates are known, the electronic watermark detection can be performed according to the above-mentioned embodiment. It is not necessary that the spatial block coordinates are known. However, it is needed that the block size (k pixels×k pixels), conversion rule to frequency regions, electronic watermark data, and the like are known. Such information are predetermined between the electronic watermark inserting device and the detector. If the information is leaked to the third party, data may be illegally replicated.

In the above-mentioned embodiment, original images are subjected to a discrete cosine transformation (DCT). The frequency spectrum may be resolved by performing orthogonal conversion including Hadamard transformation (Hadamard-Walsh transformation), wavelet transformation, multiple resolution, sub-band method, discrete Fourier transformation, Haar transformation, Karhunen-Loeve transformation, gradient Hadamard transformation, and the like.

Each above-mentioned embodiment shows the example of burying invisible electronic watermark data. However, the concept of the invention is not impaired by burying visible electronic watermark data.

Moreover, in each embodiment, the scaling parameter can be selected from scaling parameters that add an additional watermark value that adversely affects the visual quality of data. The watermark value can be selected according to the normal distribution.

As described above, the present invention has the advantage in that since the same electronic watermark data is not buried in an image plural number of times, degradation in image quality can be avoided.

Moreover, the present invention can deal with electronic watermark data visually or invisibly. Hence, the degradation in image quality of the particular portion where the same electronic watermark data is overwritten can be avoided by detecting the presence or absence of the same electronic watermark data within an image with reference electronic watermark data. Even the original image copyright holder cannot insert electronic watermark data to the original image twice or more so that the author personality right can be substantially maintained validly.

The entire disclosure of Japanese Application No. 10-123691 filed May 6, 1998 including specification, claims, drawing and summary are incorporated herein by reference in its entirely.

What is claimed is:

1. An electronic watermark insertion device, comprising:
   discrete cosine transforming means for subjecting an input image to a discrete cosine transformation;
   electronic watermark burying means for inserting electronic watermark data into data transformed by said discrete cosine transforming means;
   electronic watermark detecting means for detecting whether or not said electronic watermark data to be inserted by said electronic watermark burying means has been already inserted into said input image; and
   selecting means for selecting said output data from said discrete cosine transforming means when said electronic watermark detecting means detects that said electronic watermark data has been already inserted into said input image or for selecting output data from said electronic watermark burying means when said electronic watermark detecting means does not detect that said electronic watermark data has been inserted into said input image; and
   means for subjecting data selected by said selecting means to an inverse discrete cosine transformation.

2. The electronic watermark insertion device defined in claim 1, wherein said electronic watermark detecting means decides that the corresponding electronic watermark data is buried, when a statistical similarity C is more than a specific value.

3. The electronic watermark insertion device defined in claim 1, said electronic watermark detecting means first orthogonally converts an image with said electronic watermark data into a frequency component; calculates and extracts electronic watermark data W(i) using the formula W(i)=(F(i)−f(i))/f(i), where both an original image and electronic watermark data candidate wi (where i=1, 2, . . . n) are known; where f(1), f(2), . . . f(n) to which electronic watermarks are respectively buried in a frequency range correspond factor values F(1), F(2), . . . F(n); next calculates a statistical similarity C between w(i) and W(i) using the formula, C=W•w/(WD×wD), where W=(W(1), W(2), . . . W(n)), w=(w(1), w(2), . . . w(n)), WD=the absolute value of a vector W, and wD=the absolute value of a vector w, and the symbol • represents a vector inner product; and detects that said electronic watermark data is in a buried state when said statistical similarity C is more than a specific value.

4. The electronic watermark insertion device defined in claim 1, wherein said electronic watermark burying means sets AC frequency components (f(1), f(2), . . . , f(n)) in a frequency increasing order over a frequency range after a discrete cosine transformation; selects electronic watermark data, w(1), w(2), . . . , w(n), from normal distribution having an average of 0 and a dispersion of 1; and calculates respective (i)s the formula, F(i)=f(i)+α×|f(i)|×w(i) (where α is a scaling factor) so that an image, in which said electronic watermark data is buried, is obtained from the frequency component in which f(i) is substituted with F(i).

5. The electronic watermark insertion device defined in claim 1, wherein said electronic watermark burying means sets AC frequency components (f(1), f(2), . . . , f(n)) in a frequency increasing order over a frequency range after a discrete cosine transformation; selects electronic watermark data, w(1), w(2), . . . , w(n), from normal distribution having an average of 0 and a dispersion of 1; and calculates respective (i)s using the formula, F(i)=f(i)+α×avg|f(i)|×w(i) (where α is a scaling factor and avg f(i) is a partial average of absolute values of f(i) at three adjacent points) so that an image, in which said electronic watermark data is buried, is obtained from the frequency component in which f(i) is substituted with F(i).

6. An electronic watermark insertion device comprising:
   discrete cosine transforming means for subjecting an input image to a discrete cosine transformation;
   electronic watermark detecting means for detecting whether or not electronic watermark data to be inserted has been already inserted into said input image;
   electronic watermark data selecting means for selecting electronic watermark data by which said input image is not affected in data insertion when said electronic watermark detecting means detects said electronic watermark data already inserted into said input image or for selecting said electronic watermark data to be inserted when said electronic watermark detecting means does not detect said electronic watermark data inserted into said input image;
   electronic watermark burying means for inserting electric watermark data selected by said electronic watermark data selecting means into data transformed by said discrete cosine transforming means; and
   inverse discrete cosine transforming means for subjecting data into which said electronic watermark data is buried by said electronic watermark burying means, to an inverse discrete cosine transformation.

7. The electronic watermark insertion device defined in claim 6, wherein said electronic watermark detecting means decides that the corresponding electronic watermark data is buried, when a statistical similarity C is more than a specific value.

8. The electronic watermark insertion device defined in claim 6, said electronic watermark detecting means first orthogonally converts an image with said electronic watermark data into a frequency component; calculates and extracts electronic watermark data W(i) using the formula W(i)=(F(i)−f(i))/f(i), where both an original image and electronic watermark data candidate wi (where i=1, 2, ... n) are known; where f(i), f(2), ... f(n) to which electronic watermarks are respectively buried in a frequency range correspond factor values F(1), F(2), ... F(n); next calculates a statistical similarity C between w(i) and W(i) using the formula, C=W•w/(WD×wD), where W=(W(1), W(2), ... W(n)), w=(w(1), w(2), ... w(n)), WD=the absolute value of a vector W, and wD=the absolute value of a vector w, and the symbol • represents a vector inner product; and detects that said electronic watermark data is in a buried state when said statistical similarity C is more than a specific value.

9. The electronic watermark insertion device defined in claim 6, wherein said electronic watermark burying means sets AC frequency components (f(l), f(2), ... , f(n)) in a frequency increasing order over a frequency range after a discrete cosine transformation; selects electronic watermark data, w(1), w(2), ... , w(n), from normal distribution having an average of 0 and a dispersion of 1; and calculates respective (i)s the formula, F(i)=f(i)+α×|f(i)|×w(i) (where α is a scaling factor) so that an image, in which said electronic watermark data is buried, is obtained from the frequency component in which f(i) is substituted with F(i).

10. The electronic watermark insertion device defined in claim 6, wherein said electronic watermark burying means sets AC frequency components (f(1), f(2), ... , f(n)) in a frequency increasing order over a frequency range after a discrete cosine transformation; selects electronic watermark data, w(1), w(2), ... , w(n), from normal distribution having an average of 0 and a dispersion of 1; and calculates respective (i)s using the formula, F(i)=f(i)+α×avg|f(i)|×w(i) (where α is a scaling factor and avg f(i) is a partial average of absolute values of f(i) at three adjacent points) so that an image, in which said electronic watermark data is buried, is obtained from the frequency component in which f(i) is substituted with F(i).

11. An electronic watermark insertion device, comprising:

orthogonal converting means for subjecting an input image to an orthogonal conversion;

electronic watermark burying means for inserting electronic watermark data to data transformed by said orthogonal converting means;

electronic watermark detecting means for detecting whether or not said electronic watermark data to be inserted by said electronic watermark burying means has been already inserted into said input image;

selecting means for selecting said output data from said orthogonal converting means when said electronic watermark detecting means detects said electronic watermark data already inserted into said input image or for selecting output data from said electronic watermark burying means when said electronic watermark detecting means does not detect said electronic watermark data inserted into said input image; and means for subjecting data selected by said selecting means into an inverse discrete cosine transformation.

12. The electronic watermark insertion device defined in claim 11, wherein said electronic watermark detecting means decides that the corresponding electronic watermark data is buried, when a statistical similarity C is more than a specific value.

13. The electronic watermark inserting device defined in claim 11, wherein said orthogonal converting means performs discrete Fourier transformation, discrete cosine transformation, Hadamard-Walsh transformation, or Karhunen-Loeve transformation.

14. An electronic watermark insertion device comprising:

orthogonal converting means for subjecting an input image to an orthogonal conversion;

electronic watermark detecting means for detecting whether or not electronic watermark data to be inserted has been already inserted into said input image;

electronic watermark data selecting means for selecting electronic watermark data by which said input image is not affected in data insertion when said electronic watermark detecting means detects said electronic watermark data already inserted into said input image or for selecting said electronic watermark data to be inserted when said electronic watermark detecting means does not detect said electronic watermark data inserted into said input image;

electronic watermark burying means for inserting electric watermark data selected by said electronic watermark data selecting means into data converted by said orthogonal converting means; and means for subjecting data into which said electronic watermark data is buried by said electronic watermark burying means, to an inverse orthogonal conversion.

15. The electronic watermark insertion device defined in claim 14, wherein said electronic watermark detecting means decides that the corresponding electronic watermark data is buried, when a statistical similarity C is more than a specific value.

16. The electronic watermark inserting device defined in claim 14, wherein said orthogonal converting means performs discrete Fourier transformation, discrete cosine transformation, Hadamard-Walsh transformation, or Karhunen-Loeve transformation.

* * * * *